(12) United States Patent
Haartsen et al.

(10) Patent No.: US 9,363,778 B2
(45) Date of Patent: Jun. 7, 2016

(54) METHOD, USER EQUIPMENT AND RADIO BASE STATION FOR RANDOM ACCESS IN A CELLULAR TELECOMMUNICATIONS SYSTEM TECHNICAL FIELD OF THE INVENTION

(75) Inventors: Jacobus Haartsen, Rolde (NL); Erik Dahlman, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 931 days.

(21) Appl. No.: 12/296,401

(22) PCT Filed: Apr. 7, 2006

(86) PCT No.: PCT/SE2006/050064
§ 371 (c)(1),
(2), (4) Date: Oct. 7, 2008

(87) PCT Pub. No.: WO2007/117186
PCT Pub. Date: Oct. 18, 2007

(65) Prior Publication Data
US 2009/0161599 A1   Jun. 25, 2009

(51) Int. Cl.
 *H04J 3/00* (2006.01)
 *H04W 4/00* (2009.01)
 *H04W 56/00* (2009.01)
 *H04W 74/08* (2009.01)

(52) U.S. Cl.
 CPC .......... *H04W 56/0045* (2013.01); *H04W 56/00* (2013.01); *H04W 74/0891* (2013.01)

(58) Field of Classification Search
 USPC .......... 370/508, 326, 329, 229, 350; 455/434
 See application file for complete search history.

(56) References Cited

U.S. PATENT DOCUMENTS

| 6,016,322 A * | 1/2000 | Goldman ...................... 370/508 |
| 6,996,060 B1 | 2/2006 | Dahlby et al. |
| 2002/0131379 A1 * | 9/2002 | Lee ...................... H04B 7/2618 370/333 |
| 2003/0054813 A1 * | 3/2003 | Riley et al. ..................... 455/424 |
| 2003/0054829 A1 * | 3/2003 | Moisio .......................... 455/452 |

* cited by examiner

*Primary Examiner* — Yemane Mesfin
*Assistant Examiner* — Henry Baron

(57) ABSTRACT

The present invention relates to a random access process in a cellular communications system and to a user equipment (UE) and a NodeB adapted for performing the process. A problem with the random access is that the time slot for receiving a random access request (RA-request) has a long unused guard portion. When the UE transmits the RA-request, the distance to the receiving NodeB is unknown, and the purpose of the guard portion is to accommodate for propagation delay. The disadvantage is the inefficient use of the random access channel which results in long delays for UEs to access the network. The present invention solves the problem with a method in which the UE position is determined and the distance and propagation delay between the UE and NodeB is calculated before the transmission of the RA-request, and the timing of the transmission is advanced by the propagation delay.

12 Claims, 6 Drawing Sheets

METHOD, USER EQUIPMENT AND RADIO BASE STATION FOR RANDOM ACCESS IN A CELLULAR TELECOMMUNICATIONS SYSTEM TECHNICAL FIELD OF THE INVENTION

TECHNICAL FIELD OF THE INVENTION

The present invention relates to a cellular communications system and in particular a method for a random access procedure and to a user equipment adapted for carrying out the procedure.

DESCRIPTION OF RELATED ART

A user equipment, in the further description referred to as UE, (also called a mobile terminal) has to access the cellular network in order to register after power-on. Initially, the UE will scan the frequency band to find broadcast control channels (BCCH) which will reveal the network identity and additional network information. The UE will synchronize in frequency and time to the network via the BCCH. Next, the UE will have to send a message in the uplink to notify the network of its presence. Therefore, a random access procedure is required. Physical random access channels (PRACH) are defined where UEs can send random access (RA-) request messages. Since the network cannot control these initial uplink transmissions, the PRACH is by definition a contention-based channel shared by all the UEs in the cell. The structure of the PRACH, such as frequency, time, and maybe code, is indicated in the BCCH message.

FIG. 1 is a view of a cell served by a first NodeB, NB1, and further discloses two UEs 11 within the cell. At power on any of the UEs 11 within the cell will find the BCCH of the first NodeB, NB1, and receive information on the PRACH supported by first NodeB, NB1. By receiving the downlink channels like the BCCH, the UE 11 can obtain a coarse downlink timing to the first NodeB, NB1.

However, since the distance d to the first NodeB, NB1, is unknown, there is an unknown propagation delay between the transmission at the first NodeB, NB1, and the reception in the UE 11. The same delay will appear in the uplink. Therefore, there is a round-trip delay uncertainty. This round-trip delay is larger for a UE on the cell edge, than for a UE 11 close to the first NodeB NB1. As a result, the reception of the RA-request sent by the UE 11 may be delayed with respect to the timing of the uplink traffic and control channels. Therefore, the PRACH time slot includes a guard period, which accommodates the delay uncertainties. FIG. 2a is a time diagram of the PRACH time slot and two RA-requests sent within it. The RA-request sent from the UE 11 close to the first NodeB, NB1, will arrive at the beginning of the time slot, whereas the RA-request sent from the UE 11 at the cell border will be finalized just before the end of the time slot.

Once the RA-request has been received, the first NodeB, NB1, can estimate the propagation round-trip delay by comparing its transmission instance with the RA-requests reception instance. It will then instruct the UE 11 using time alignment (TA) messages over a downlink control channel to advance its transmission so that the reception will be aligned with other uplink channels used by other UEs 11. Once the UE 11 is uplink synchronized, only a small guard period is required between slots or sub-frames in a time-slotted system to account for drift and to reduce the number of TA messages in the downlink.

The random access procedure is not only used at power-on. A UE 11 in idle mode is normally locked to a downlink control channel. However, for power saving reasons, it will not send uplink transmissions in idle mode. Therefore, the first NodeB, NB1, has no TA information to send, and the UE 11 loses its uplink synchronization. When a call needs to be made, the UE 11 will access the network again via the PRACH in order to be time synchronized first.

US patent application publication 2002/0131379 (D1) relates to a CDMA communication system were uplink and downlink transmissions share the same physical frequency channel. This is also referred to as a TDD (Time Division Duplexing) system. D1 in its background section discusses the necessity in a TDD system for correcting timing of uplink transmissions, in order to avoid the uplink transmissions interfering with downlink transmissions. D1 further discloses that the UE 11 before registering with the network calculates the distance to the NodeB based on the path loss, which in turn depends on the downlink transmission attenuation. After estimating the distance to the NodeB the UE shifts a transmission point of an UpPTS (Uplink Pilot Time Slot) signal such that the NodeB can receive the UpPTS signal at a start boundary point of the UpPTS.

D1, further discloses that the NodeB receives the UpPTS signal and determines whether the UpPTS signal has been received exactly at its UpPTS period. If there exist a time difference, the NodeB transmits a transmission point correction value to the UE 11 through a forward physical access channel (FPACH). Upon receiving the transmission point correction value through the FPACH, the UE 11 transmits an RACH message (RA-request) at a transmission point corrected based on the received transmission point correcting value. That is, the UE determines a transmission point of the RACH message using the transmission point correcting value received through the FPACH.

Most cellular systems are based on FDD (Frequency Division Duplex), irrespective of the multiple access technology such as FDMA, TDMA, CDMA or OFDM. In FDD systems the RA-request is the first uplink transmission, on which the NodeB can make a measurement to estimate the correction needed for time alignment with the uplink time slots.

When compared to the FDD attach procedure with a RA-request in the uplink, the TDD attach procedure can be regarded a two step procedure, the first being the UpPTS signal transmission for the purpose of time correction, and the second being the RA-request transmission including the RA information. The two steps in combination correspond to a random access procedure in a FDD system.

A problem with the time correction based on path loss estimation in the UE 11, is that path loss is not mainly owing to the distance between the UE 11 and the NodeB. Much more impact on the path loss has the occurrence of obstacles, such as trees in the path between the UE 11 and NodeB, and any additional losses in the transmitter and receiver chains. Also, the weather, such as rain and snow fall, has a major impact on the attenuation. All together this makes any distance prediction based on signal attenuation unreliable to such a degree that it probably result in worse rather than better performance with respect to time alignment correction.

SUMMARY OF THE INVENTION

The object of the present invention is to provide an alternative solution for increased efficiency of the random access channel.

The solution to the problem is a method for a user equipment, wherein the user equipment synchronises to the downlink broadcast channel from a first NodeB. The UE receives information on the first NodeB geographical position and receives synchronisation signals from at least 3 positioning nodes and information of the geographical position of the positioning nodes. By triangulation the user equipment position is determined. The propagation delay between the user equipment and first NodeB is calculated and the timing of a random access request transmission is advanced to compensate for the propagation delay.

In one embodiment of the invention, the positioning nodes consist of NodeBs including the first NodeB.

The invention also comprises of a user equipment (UE) and a radio base station adapted for carrying out the inventive method.

The present invention has the advantage of the PRACH time slot is the length of the random access request itself, and a minor guard portion for accommodating any quantification errors and minor delay miscalculation. Compared to prior art PRACH time slots the guard period is diminished. Because the timing uncertainty is reduced, the random access sequence can be shortened while keeping the detection performance in the NodeB. Diminishing of the guard period and the random access request results in an overall reduction of the PRACH time slot. The random access channel is more efficiently used. The random access timeslot can be repeated more often. This has the further advantage of the delays are reduced for user equipments to access the network.

DESCRIPTION OF PREFERRED EMBODIMENTS

Figure 1:
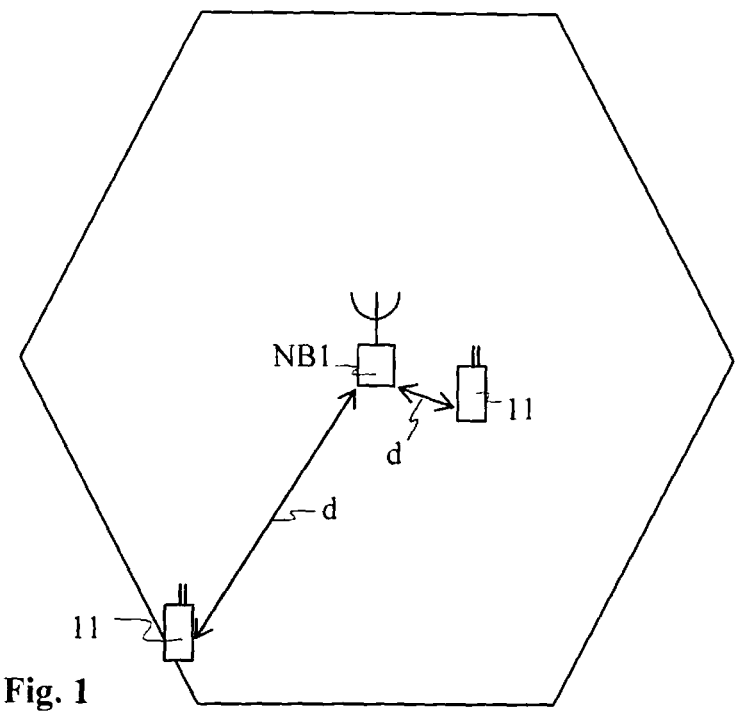
FIG. 1 is a view of a cell served by a NodeB, and with two UEs within it.
Figure 2:
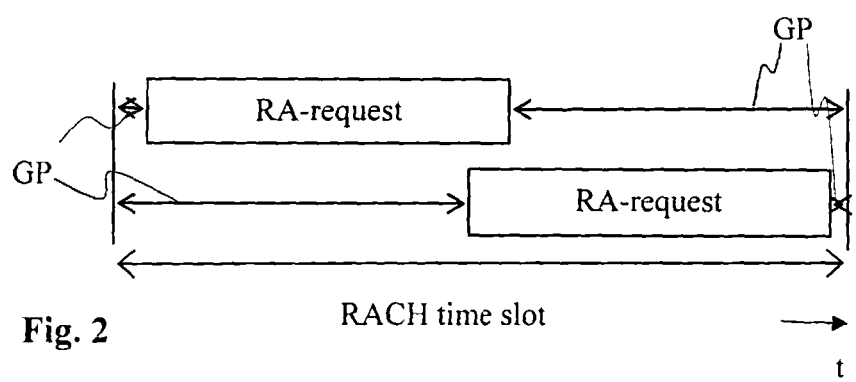
FIG. 2 is a scheme of the random access time window structure.

The present invention includes a method related to a random access process to be performed by a UE (User Equipment) in a cellular network. The random access process is performed when the UE is powered on, for the purpose of informing the cellular network on the presence of the UE. During the random access process the UE sends an RA-request (Random Access request) to the NodeB, NB1, see FIG. 1, selected for receiving the RA-request. The first NodeB, NB1, is at an unknown distance d from the UE 11 before the inventive process is started.

Figure 3:
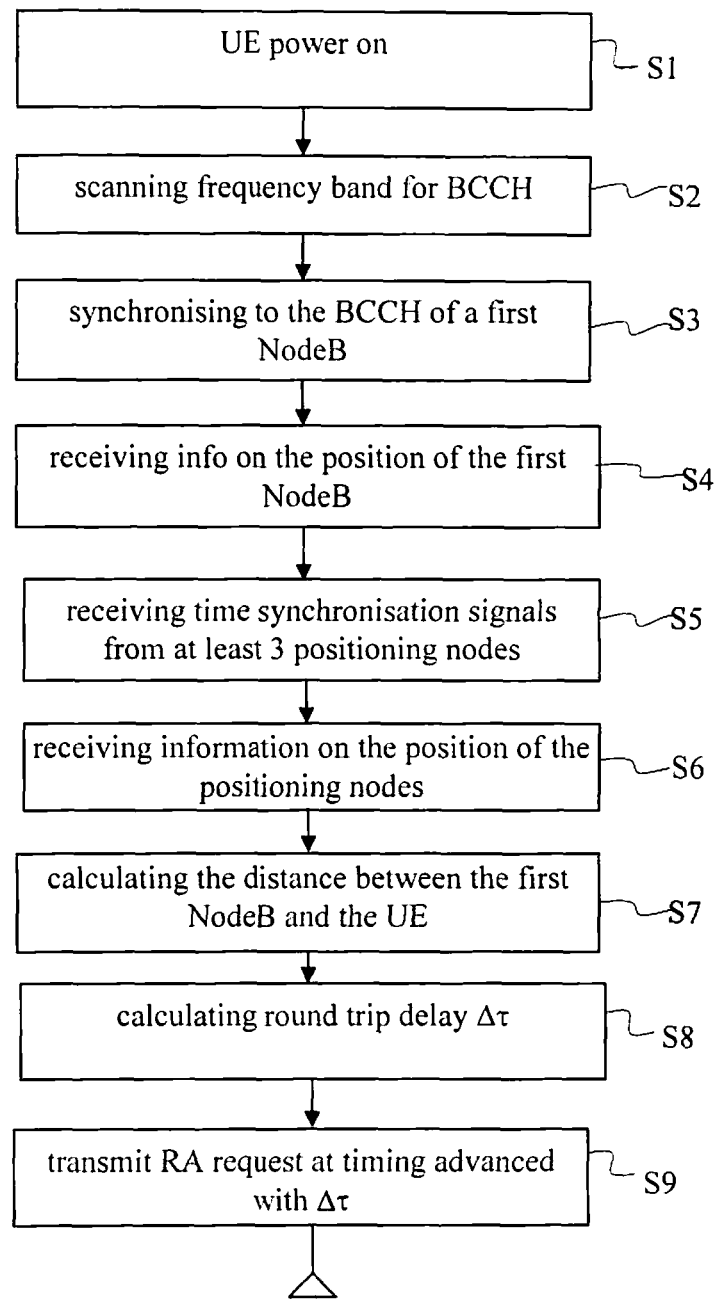
FIG. 3 is a flowchart of an inventive method.

FIG. 3 is flowchart of the general inventive method to be performed by the UE 11. Initially, the UE 11 is powered on, S1. Next, in step S2, the UE 11 scans the frequency band to find strong BCCHs (Broadcasts Control CHannels) and locks to the strongest one. In the example, it is assumed that a first NodeB, NB1, provides the strongest BCCH. In the following step S3, the UE 11 synchronises its timing to that of the BCCH. The BCCH is divided into time slots that are further grouped into frames. This structure provides the basis for the synchronisation. Moreover, the information on the BCCH is detected to find information on the structure of the uplink physical random access channel (PRACH), such as time slots available for RA-request transmissions.

In a following step, S4, the UE 11 receives information on the geographic position of at least the first NodeB, NB1.

Next, time synchronisation signals are received from at least three time synchronised positioning nodes, see the fifth step S5. Information on the position of the three positioning nodes are received in the sixth step S6.

In the seventh step S7, the distance between the UE 11 and the first NodeB NB1 is calculated based upon the received time synchronisation signals and the position of the positioning nodes.

In the following step S8, the round trip delay $\Delta\tau$ is calculated.

In the following and last step, S9, the UE 11 transmits the access burst at time advanced by the round trip delay $\Delta\tau$ relative to its synchronisation its synchronisation to the BCCH and the time slot available for the PRACH.

In one implementation of the method illustrated by FIG. 3, the positioning nodes are GPS (Global Positioning System) satellites. The GPS satellites are time synchronised and transmit a synchronisation signal and their position.

The first NodeB NB1 position is broadcasted, and the UE 11 receives the positioning information on the BCCH, in the fourth step S4. Other alternatives for receiving the first NodeB NB1 position also exist as will be described further down.

Figure 4:
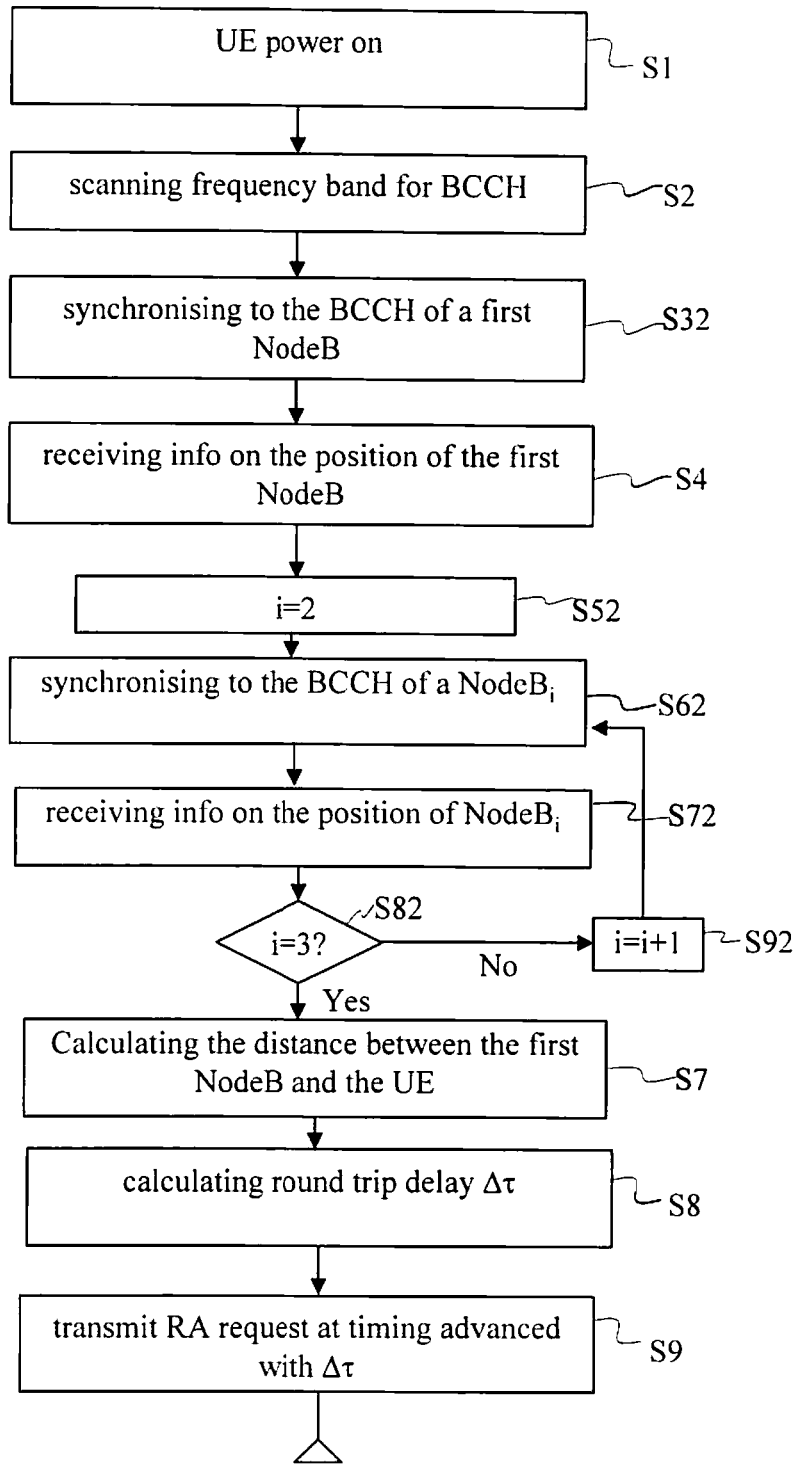
FIG. 4 is a flowchart of an embodiment of the inventive method.

In an alternative implementation of FIG. 3, the positioning nodes are NodeBs. This requires neighboring NodeBs to be time synchronized. The synchronization accuracy is in the order of the desired TA (Time Alignment) estimation accuracy. A more precise synchronization will result in a more accurate TA, which allows a shorter residual guard time to accommodate any remaining timing uncertainties. For example, if the TA estimation is desired to have an accuracy of 1 µs, the NodeBs shall be synchronised with an accuracy of at least 1 µs. The alternative implementation is illustrated in FIG. 4. The first four steps S1-S4 and the last three steps S7-S9 are the same as in FIG. 3 with the exception of the third step S32 being modified. Synchronising to the BCCH includes detecting a synchronisation signal that is included in the BCCH.

In addition to receiving the BCCH from the first NodeB, the UE 11 also repeats the process of synchronising to the BCCH of a second and a third NodeB, se steps S52-S92. The positions of all three NodeBs are received by the UE 11 on their respective BCCH, in steps S4 and S72. Alternatively, just the identities of the NodeBs are broadcasted on their respective BCCHs, and their positions are retrieved by the UE from a database. The database is downloaded in the UE via a PC interface, before the process of FIG. 3 or 4 is started. The database may alternatively be downloaded in the UE 11 from the cellular network via a radio channel. Alternatively, the NodeB position may be included in its BCCH message.

The first NodeB NB1 is the name used in this description for the NodeB to which the UE 11 sends its RA-request. Certainly, the order in which the synchronisation signals are collected from the three NodeBs may alternate such that the first NodeB NB1 need not be the first to which the UE synchronises.

Figure 5A:
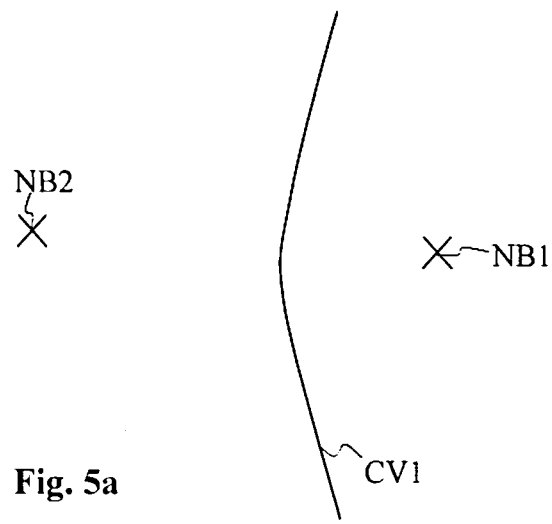
FIGS. 5a and 5b show a two dimensional plan of the geography of the NodeB positions.

For calculating the distance between the first NodeB NB1 and the UE 11, in step S7, the UE 11 position need be determined. In the case of the NodeBs providing the synchronisation signals it suffices if their relative positions and the relative UE 11 position is determined. FIG. 5 is a two dimensional plan of the NodeB sites in the geography, and illustrates the calculation of the UE 11 position. In FIG. 5a, the position of two NodeBs, NB1, NB2, are indicated and a hyperbolic curve CV1 between the NodeBs NB1, NB2 indicates a specific timing difference between the two NodeBs, NB1, NB2. The UE 11 that has measured this specific timing difference between the two NodeBs, NB1, NB2, can be positioned anywhere along the curve CV1.

Figure 5B:
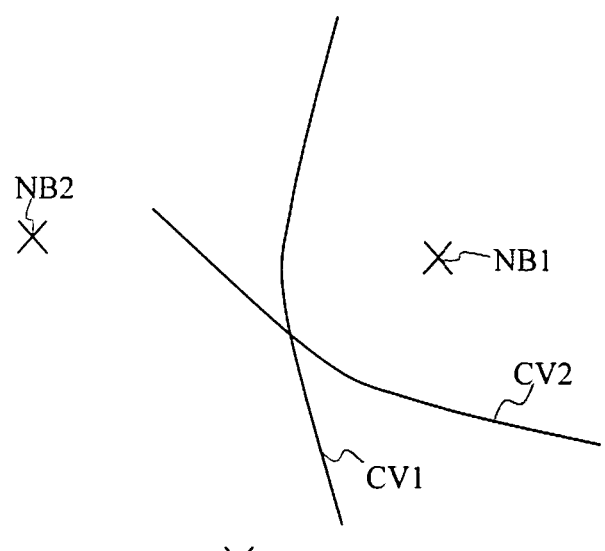

FIG. 5b is the same as FIG. 5a with the addition of a third NodeB, NB3, and a second hyperbolic curve, CV2, indicating a second specific timing difference between the first NodeB, NB1, and the third NodeB, NB3, as measured by the UE 11. The crossing of the two curves CV1, CV2, is the position of the UE 11. A third curve CV3 could be drawn based on a third timing difference between the second NodeB, NB2, and the third NodeB, NB3. This will improve the accuracy of the position estimate.

The same principle for determining the position of a terminal is used in the GPS system, except the GPS satellites are in the atmosphere instead of on the earth. For that reason receiving a synch signal from a fourth satellite is beneficial. Also, receiving synch signals from a fourth NodeB may improve the estimation of the UE 11 position, especially if the first three NodeB NB1-NB3 are positioned in a line formation rather than in a triangle. The loop, S62-S92, in FIG. 4 may beneficially be executed for more than two NodeBs.

Once the distance d between the UE 11 and the first NodeB NB1 has been determined, in step S7, the propagation round-trip delay $\Delta\tau$ is calculated in step, S8, via:

$$\Delta\tau = \frac{2d}{v}$$

where v is the speed of light.

When transmitting an access burst, as disclosed in step S9, the UE 11 shall advance its uplink timing by $\Delta\tau$ relative to the timing of the received downlink channel.

The distance determination can be re-calculated periodically, and the UE 11 can use this information to continuously update its uplink timing. This will alleviate NodeB from sending TA messages in the downlink to control the UE 11 uplink timing, also during transmission of user data.

Figure 6:
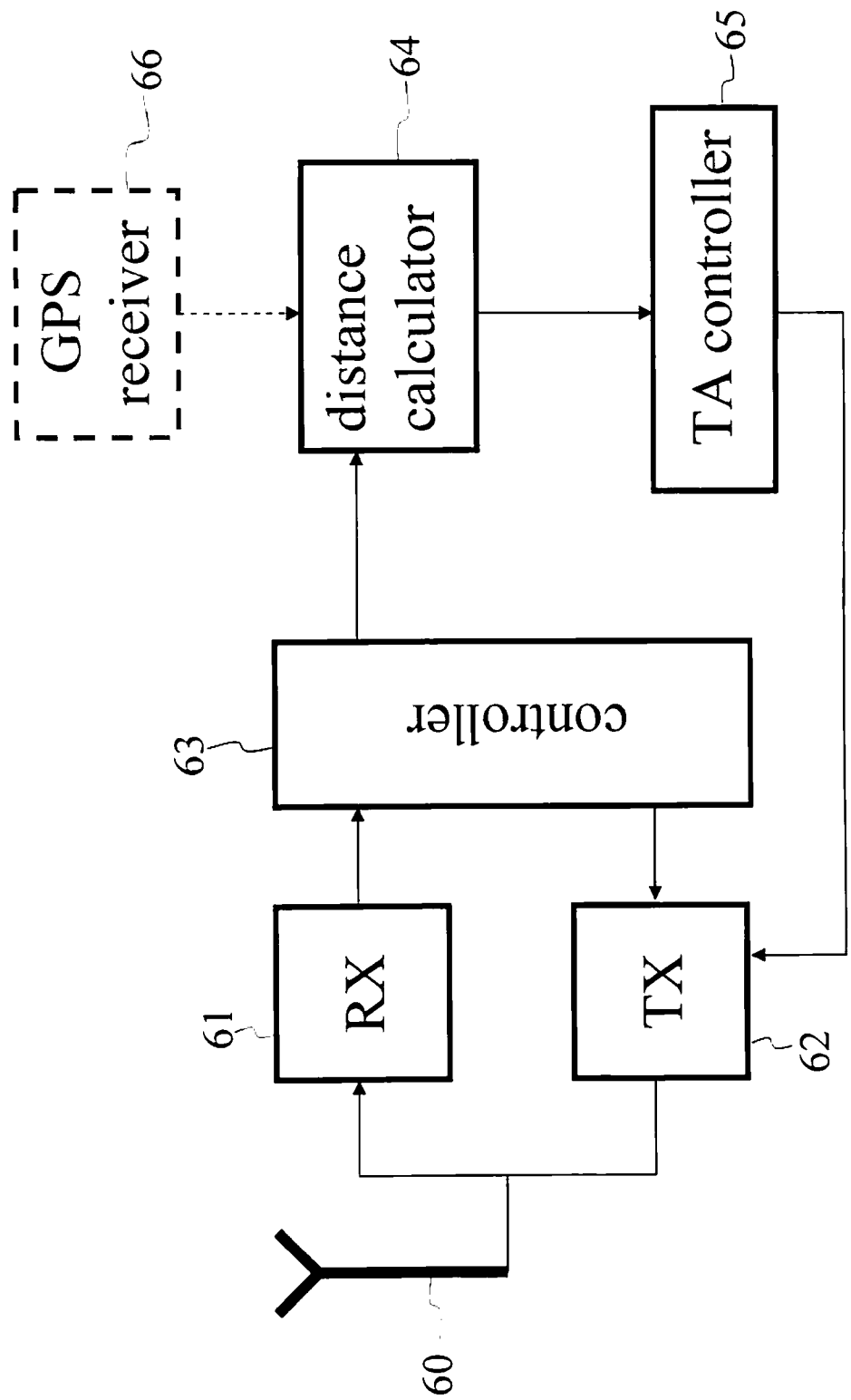
FIG. 6 is a block diagram of an UE structure.

Another aspect of the invention is the UE 11 equipment as adapted for carrying out the inventive method. FIG. 6 is a block diagram of the UE 11 structure essential for the invention. As is understood, FIG. 6 in no way represents a complete structure of the UE 11; only the parts relevant for the present invention are included. The structure comprises, an antenna 60, a receiver 61 with an input from the antenna 60, and a transmitter 62 with an output to the antenna, 60. A controller, 63, controls the operation of the receiver, 61, and the transmitter, 62, such as controlling the channels for receiving and transmitting. The controller, 63, is typically implemented by a CPU with corresponding software. The UE 11 structure is so far the same as for any prior art UE 11. Specific for the invention is though a distance calculator, 64, with an input from the controller and an output to a TA-controller, 65. The distance calculator, 64, is adapted for calculating the distance, d, to the first NodeB, NB1. There are two embodiments on its functionality depending on whether the synchronisation signals are received via GPS satellites or via NodeBs.

In the case of the NodeBs providing the synchronisation signals, distance calculator 64 receives information on the timing difference between the three different NodeBs NB1-NB3 and their respective positions or alternatively identities, from the controller, 63. If just the NodeB identities are received, the distance calculator includes a NodeB position database through which the NodeB identities can be mapped to the NodeB positions. The UE 11 position is then calculated according to the triangulation principle. The distance calculator further calculates the round trip delay $\Delta\tau$ based on the distance d between the UE and the NodeB.

The TA-controller, 65, receives the information on the round-trip-propagation delay from the distance calculator, 64, and controls the transmitter, 62, to advance its transmission timing by $\Delta\tau$ relative to its downlink timing.

Alternatively the UE 11 is adapted for carrying out the propagation delay with the use of a GPS receiver 66. In this embodiment there is an input to the distance calculator, 64, from the GPS receiver, 66, for information on the UE 11 position. The distance calculator, 64, receives information from the controller, 63, on the position of the first NodeB, NB1, or alternatively receives the identity of the first NodeB 11 and retrieves its position from the internal database. The distance calculator, 64, further calculates the distance, d, and corresponding propagation delay.

Figure 7:
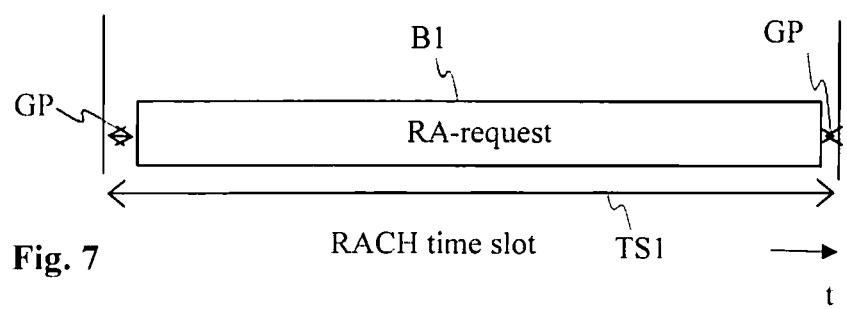
FIG. 7 is a time diagram of an access time window and access burst structure.

FIG. 7 is a time diagram of the basic structure of the PRACH time slot TS1 and the RA-request B1, that is possible to implement with the method of the present invention. The guard period, GP, within the frame is almost eliminated. Just a small guard period, GP, is left to accommodate for any errors in the estimation of the round-trip-propagation delay $\Delta\tau$. The RA-request, B1, occupies about 95-99% of the PRACH time slot, TS1, the remaining part of the PRACH time slot, TS1, is guard period, GP. This can be compared with GSM system where the access burst has a duration of 325 µs which is 56% of the time slot period of 577 µs. It can also be compared with the proposal for Super 3G, where the access burst duration is 400 µs and that occupies 80% of the time slot period of 500 µs. In addition to a reduction of the guard period, GP, the invention may result in a reduction of the random access burst as well. Since the timing uncertainty reduces considerably, the NodeB detector can operate under lower SNR conditions while keeping the same performance expressed in false alarm and missed detection rates.

Figure 8:
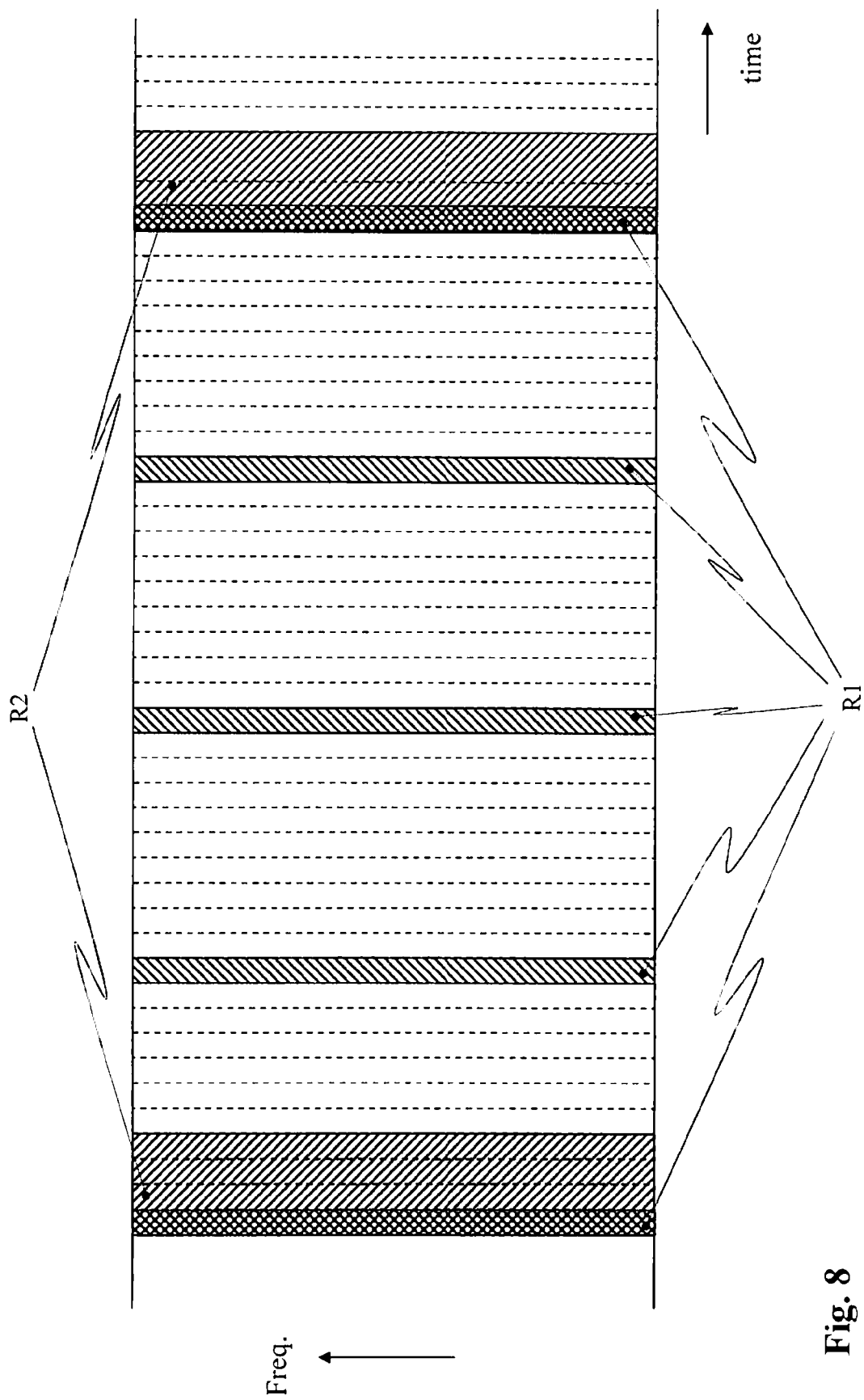
FIG. 8 is a time diagram of an inventive and a conventional PRACH structure on the same frequency carrier.

FIG. 8 is a time frequency diagram of a first PRACH structure R1 that consists of time slots, TS1, at a specified frequency band, and that are regularly repeated. Other time slots for other channels are interspersed between the first PRACH time slots TS1. Only UEs arranged for performing the inventive method may use the advanced PRACH R1. There might also exist UEs, 11, that are not capable of performing the inventive method. Therefore, the same frequency also carries a second PRACH structure R2 to be used by UEs 11 lacking the capability to perform the method of the present invention. The time slots TS1 of the first PRACH structure R1 are shorter that the time slots of the second conventional PRACH R2. The time slots of the first PRACH R1 are repeated more often than the time slots of the conventional PRACH R2. Thereby the access delay for the advanced UEs 11 is reduced. In the example part of the time slot of the second PRACH structure R2 coincide with time slot of the first PRACH structure R1. The consequence is RA-requests transmitted by advanced UEs compete with RA-request transmitted by conventional UEs in at least part of the second PRACH structure R2.

Alternatively the time slots of the first and second PRACHs R1, R2 are the same length, whereas the RA-requests transmitted on the first PRACH R1 according to the inventive method have longer duration than the RA-request transmitted on the second conventional PRACH R2.

To carry out the invention, the first NodeB NB1 need be adapted for receiving the RA-request within the first time slot TS1 that accommodates only 5% guard space or less. This is the way burst are conventionally received during communication on an established link. In case not all UEs can advance the random access transmission according to the invention, the NodeB, NB1, need support the first and second types of PRACH. Moreover, the NodeB shall broadcast its geographical position. When initiating a new NodeB, NB1, this data must be entered in a memory. Furthermore, the BCCH shall include a field for the NodeN NB1 position information. For existing systems, the cell identity broadcasted by NodeBs can be used. Of course this must be applied to all NodeBs (NB1-NB3, in a network that is intended to be capable as acting a first NodeB, NB1. In this case, a data base is needed in the UE that maps the cell identity to the NodeB position.

Although the examples on implementation of the present invention are given in a FDD mode system and the FDD mode is the primary intended mode for implementation, there is nothing that prevents the present invention from being implemented in a TDD mode system. Moreover, the present invention can be implemented in systems based on various types of access technologies, i.e. in FDMA, TDMA, CDMA or OFDMA technologies. The PRACH in these types of systems is structured in repeated time slots, TS1, within which random UEs 11 are allowed to transmit RA-requests. Also in the situation of a hard handover, a channel dedicated for a certain UE 11 to transmit a first access burst is organized into time windows, specific of these available for the access burst. In this description the term NodeB is used for a radio base station as is the term standardized within 3GPP. The application of the present invention is in no way limited to cellular systems standardized by the 3GPP.

The invention claimed is:

1. A method for a random access by a user equipment to a cellular communication network, comprising:
    scanning radio channels of the cellular communication network, to find available downlink broadcast channels; and
    in response to finding an available downlink broadcast channel associated with a first base station and before the user equipment is identified to the cellular communication network:
    synchronising to the downlink broadcast channel of the first base station;
    receiving parameters indicating a position of the first base station;
    receiving synchronisation signals from at least 3 time synchronised positioning nodes;
    receiving information on the position of said positioning nodes;
    determining a position of the user equipment based on the synchronisation signals and the received information on the position of said positioning nodes;
    determining a distance between the user equipment and the first base station based on the position of the user equipment and the position of the first base station;
    determining a propagation delay between the user equipment and the first base station prior to transmitting a random access request message on a time slotted random access channel of the first base station, based on the determined distance between the user equipment and the first base station; and
    transmitting the random access request message on the time slotted random access channel of the first base station and advancing the timing of said transmitting of the random access request message by the propagation delay.

2. A method according to claim 1 wherein the information on positions of the positioning nodes is received with the synchronisation signals.

3. A method according to claim 1 wherein the information on positions of the positioning node is retrieved from a data base that is loaded in the user equipment prior to the transmitting step.

4. A method according to claim 1, wherein the position nodes comprise GPS satellites.

5. A method according to 4 wherein first base station position parameters are received on the broadcast channel of the first base station.

6. A method according to 4 wherein first base station identity is received on the broadcast channel of the first base station, and the position of the first base station is retrieved from a database that is downloaded in the user equipment prior to the transmitting.

7. A method according to claim 1, wherein the position nodes comprises said first base station and a second and a third base station.

8. A method according to claim 1 wherein said advancing step is made relative to the synchronisation to the downlink broadcast channel.

9. A method according to claim 1, wherein the random access channel is divided into time slots of a predefined period, and the random access request message occupies 95% or more of the time slot period.

10. A user equipment for a cellular communication network, comprising:
    a receiver arranged to synchronize to a broadcast channel transmitted by a first base station and receive information on the uplink random access channel structure when the user equipment is in idle mode;
    a transmitter, time synchronised with the received broadcast channel and configured to transmit a random access request message on said random access channel to said first base station before the user equipment is identified to the cellular communication network;
    a distance calculator configured to:
        receive information on a geographical position of said user equipment via an input from a GPS receiver;
        receive information for identifying the geographical position of said first base station, or alternatively, receiving at least mutual difference in synchronisation signals received via said receiver from the first base station and at least two other base stations together with information for identifying the geographical position of said three or more base stations;
        determine a distance between the user equipment and the first base station based on the geographical position of the user equipment and the geographical position of the first base station; and
        determine the propagation delay between the user equipment and said first base station prior to the transmitter transmitting the random access request message on a time slotted random access channel of the first base station, based on the determined distance between the user equipment and the first base station; and
    a time alignment controller with an input from the distance calculator and an output to the transmitter and configured to advance the transmission timing of said random access request message to compensate for the propagation delay to said base station.

11. A user equipment according to claim 10 further comprising a controller controlling the operation of the receiver, the distance calculator, and the transmitter.

12. A user equipment according to claim 10 wherein the distance calculator is connected to, or comprises, a memory for storing a database of base station positions and further is arranged to retrieve the position of a base station by reference to its identity.

* * * * *